July 30, 1940. H. J. UMHAUER 2,209,434
RECORD CONTROLLED MACHINE
Filed Feb. 27, 1935 11 Sheets-Sheet 2

INVENTOR
Herbert J. Umhauer
BY
ATTORNEY

July 30, 1940.  H. J. UMHAUER  2,209,434
RECORD CONTROLLED MACHINE
Filed Feb. 27, 1935   11 Sheets-Sheet 3

INVENTOR
Herbert J. Umhauer
BY
ATTORNEY

July 30, 1940. H. J. UMHAUER 2,209,434
RECORD CONTROLLED MACHINE
Filed Feb. 27, 1935 11 Sheets-Sheet 4

INVENTOR
Herbert J. Umhauer
BY
ATTORNEY

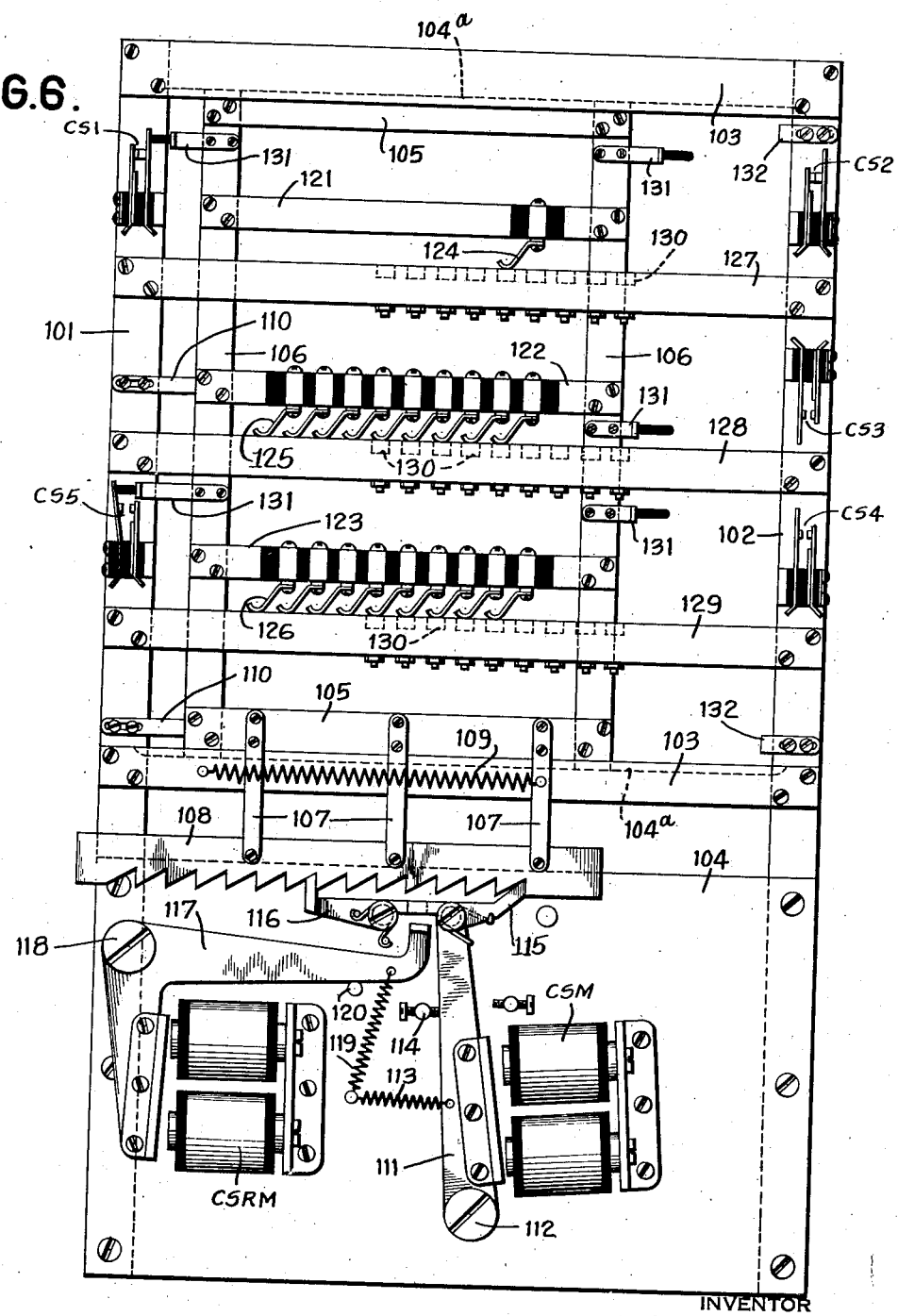

July 30, 1940.  H. J. UMHAUER  2,209,434
RECORD CONTROLLED MACHINE
Filed Feb. 27, 1935   11 Sheets-Sheet 6

INVENTOR
Herbert J. Umhauer
BY
ATTORNEY

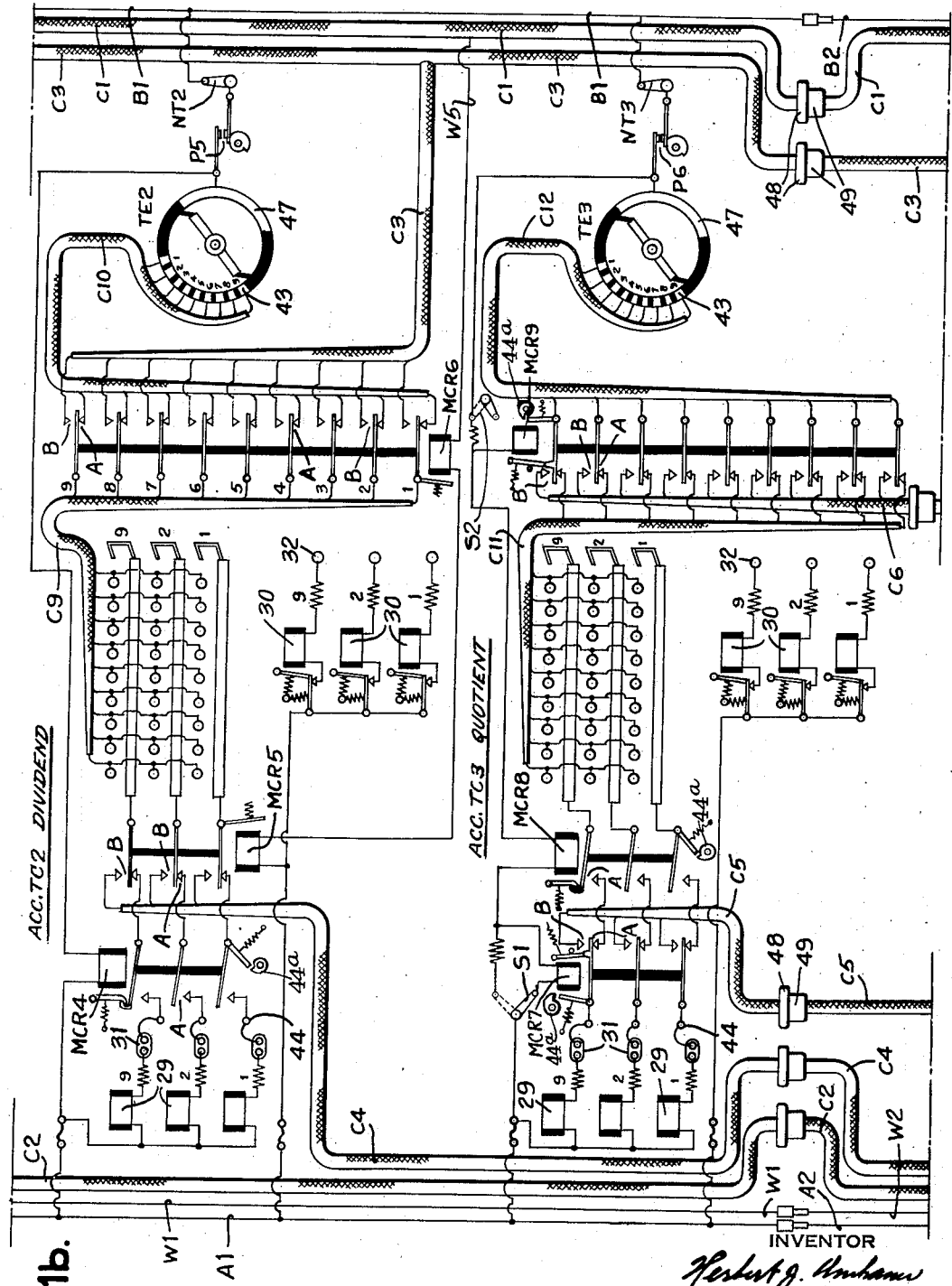

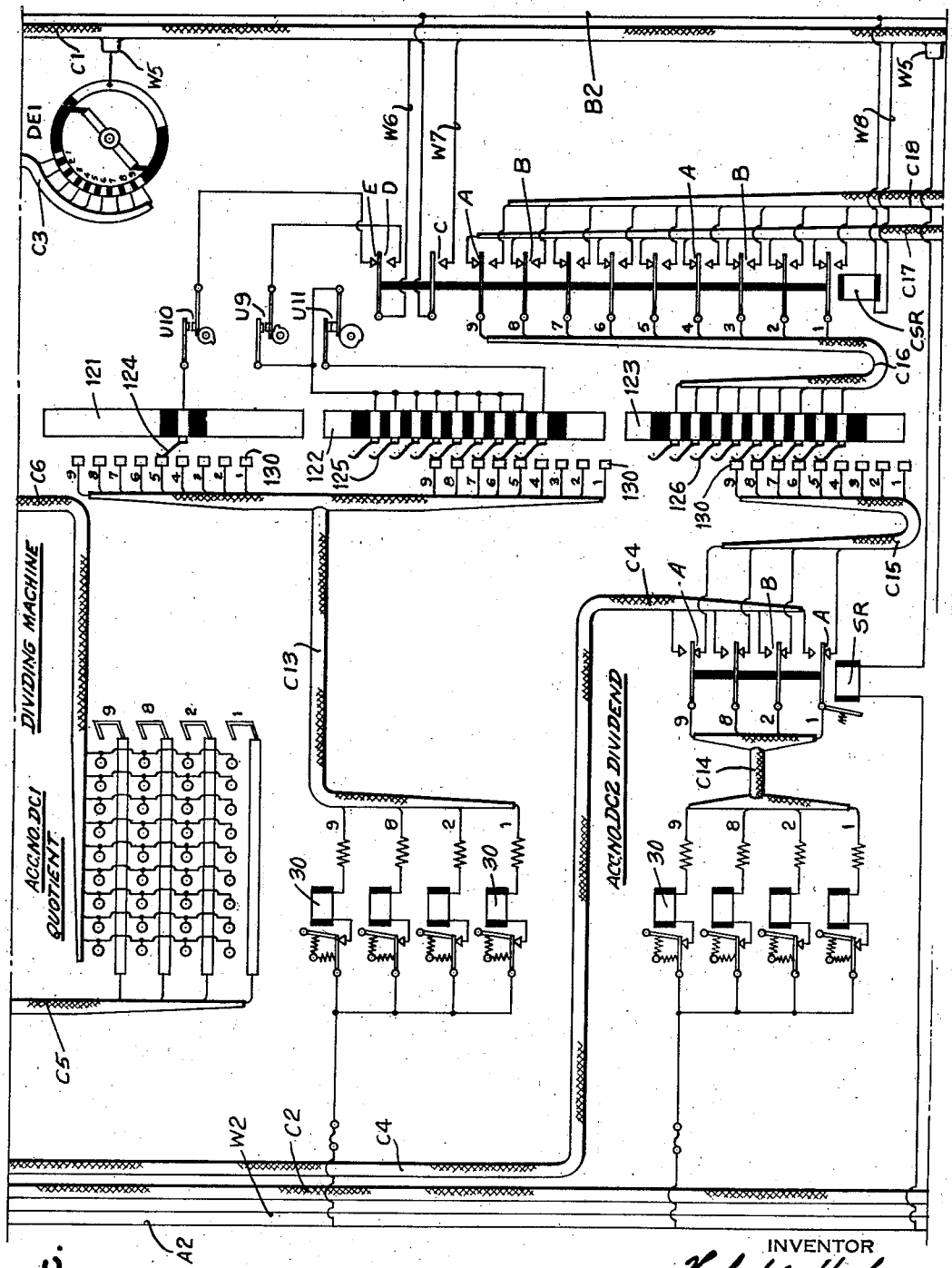

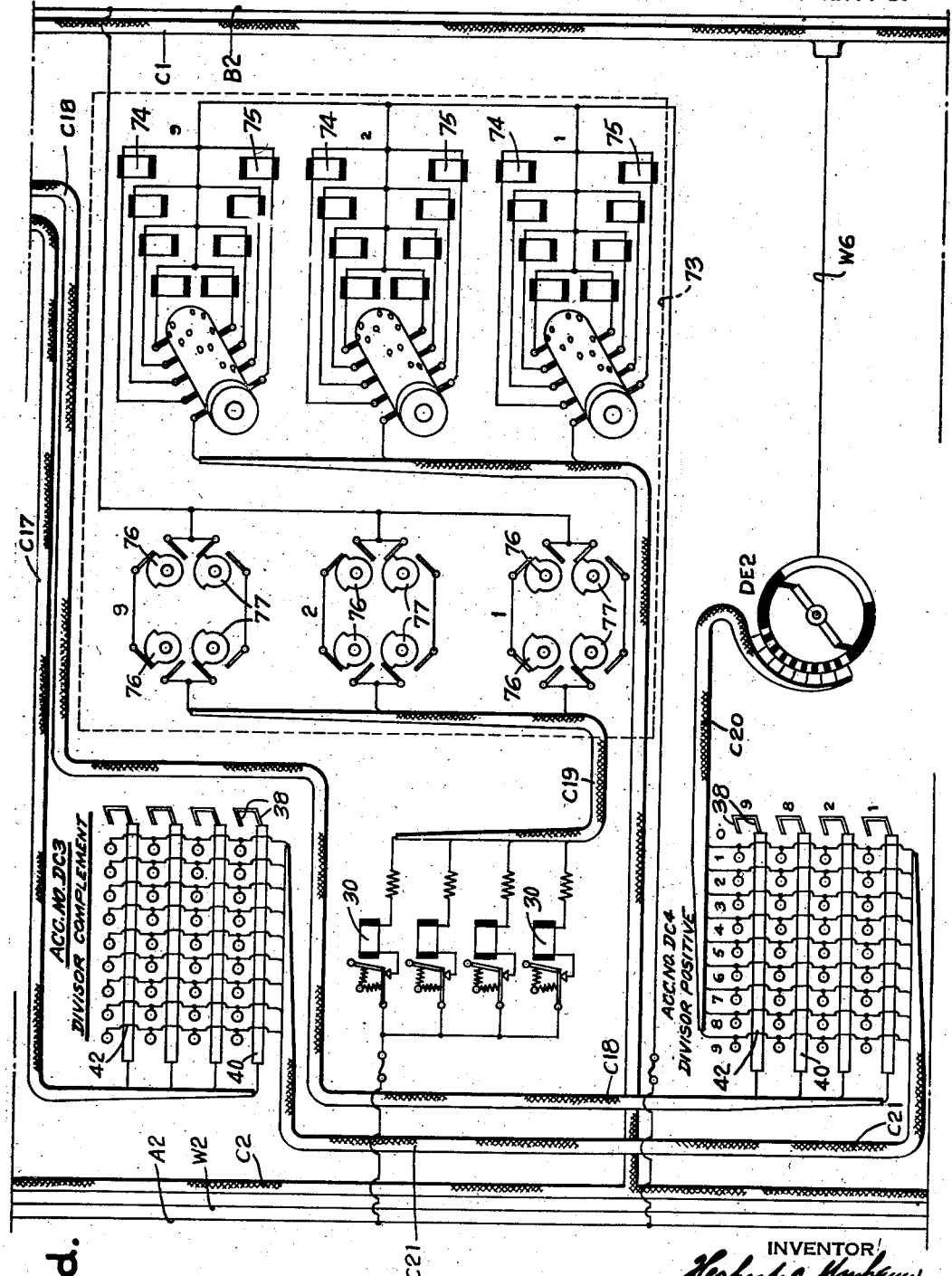

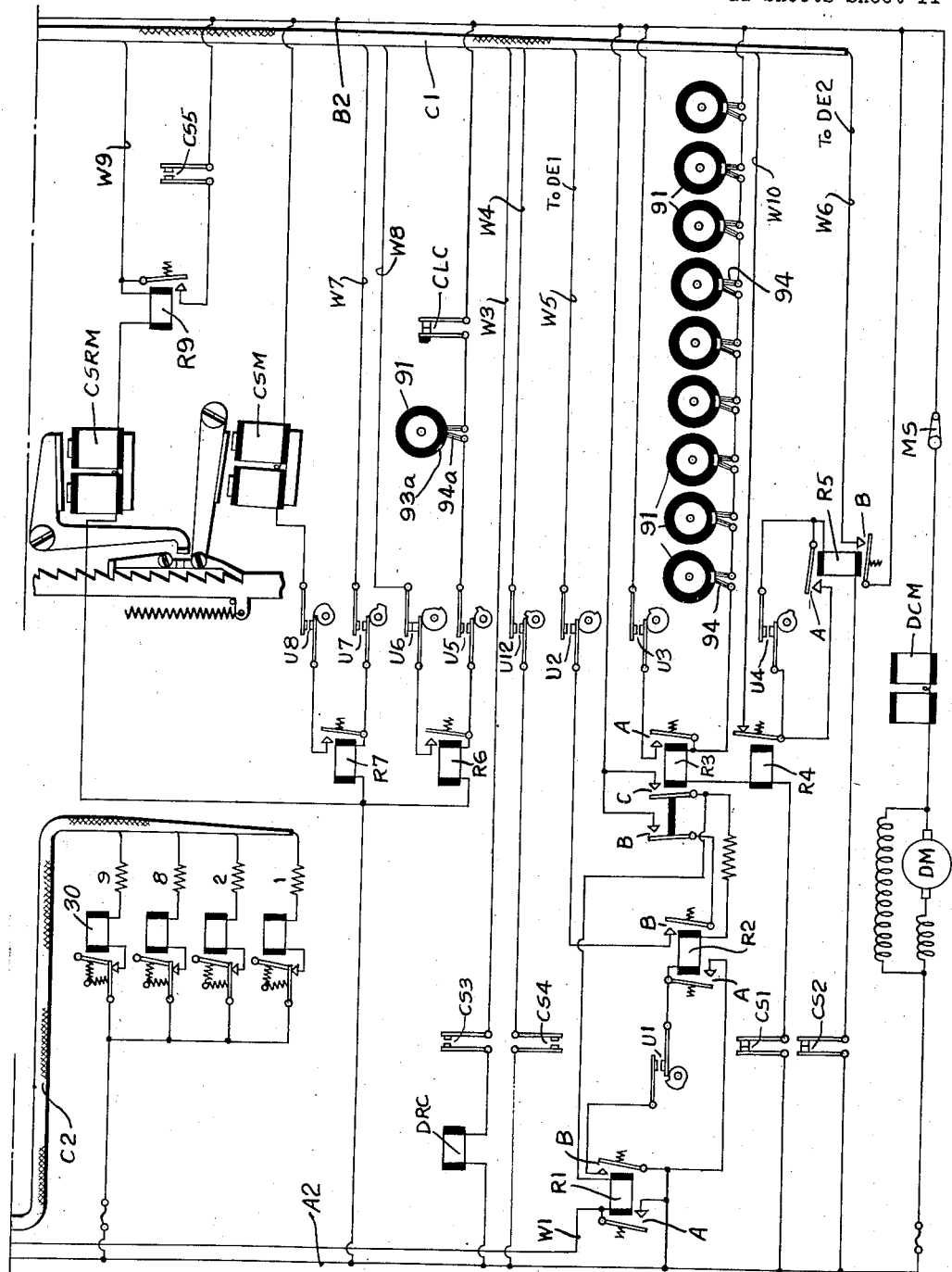

Patented July 30, 1940

2,209,434

UNITED STATES PATENT OFFICE

2,209,434

RECORD CONTROLLED MACHINE

Herbert J. Umhauer, Augusta, Maine, assignor to International Business Machines Corporation, New York, N. Y., a corporation of New York Application February 27, 1935, Serial No. 8,436

13 Claims. (Cl. 235—61.7)

This invention relates to record controlled machines in general.

The principal object of the invention is to provide an automatic dividing machine.

A broad object is to provide a machine capable of automatically performing the mathematical operation of division under control of perforated records.

Another broad object is to provide a machine capable of automatically computing averages.

Still another object is to provide a dividing machine which can operate in conjunction with a standard accounting machine as an attachment thereto without in any way interfering with the normal operation of the accounting machine or requiring any material alteration of the accounting machine either structurally or in principle of operation.

An object is to provide a dividing machine which is relatively simple in construction and operation as compared with dividing machines previously known in the art.

Another object is to provide a dividing machine which is very flexible in its operation and coordination with accounting machines to which it is applied.

Still another object is to provide a dividing machine which is composed of standard parts.

Another object is to provide a dividing machine which is easily applied or coordinated with accounting machines of different types.

Various other objects, advantages, or features will be pointed out in the following description and claims or will be apparent from a study of the description, claims and drawings.

In the drawings:

Fig. 6 is an elevation of the column shifter device.

Fig. 7 is a perspective view of one of the dividend counter commutators.

Figure 8:
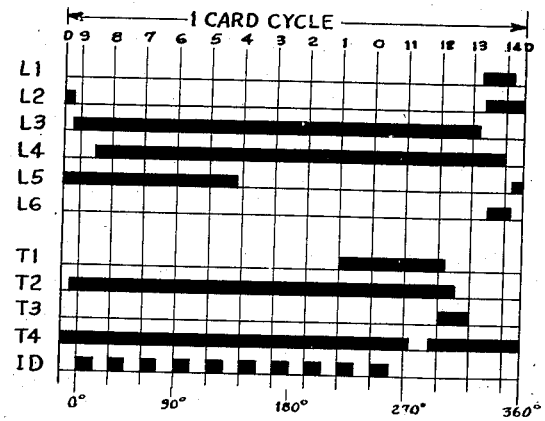
Figure 9:
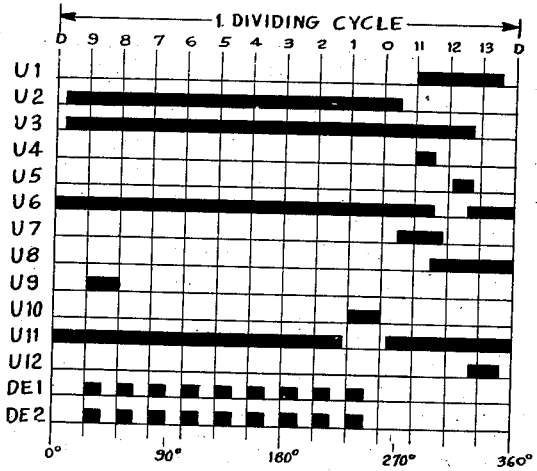
Figure 10:
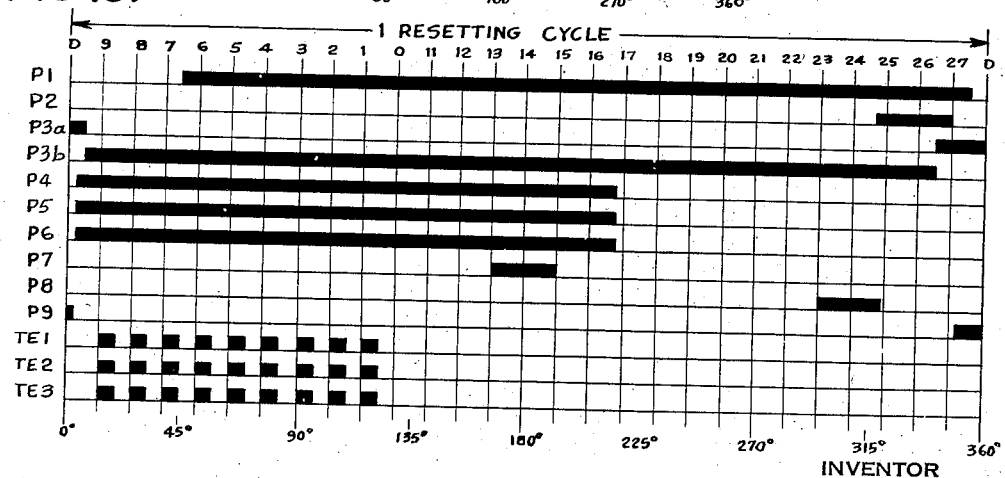

Figs. 8, 9, and 10 are electrical time charts for a card cycle, dividing cycle, and resetting cycle, respectively.

Figs. 11a to 11e together form an electrical wiring diagram of the tabulating machine and dividing machine as plugged together ready for operation.

The invention comprises an automatic dividing machine adapted to be plugged to a standard record controlled accounting and statistical machine such as the well known "International" electric accounting machine. These machines are commonly called "tabulating machines." The drawings show the dividing machine attached to the foregoing machine but this is illustrative only as the dividing machine may be used in connection with other tabulating machines by suitable modification of the operating connections. The general construction of the "International" electric accounting machine is described in a large number of patents of which No. 1,762,145 and No. 1,822,594 describe most of the mechanism involved herein. It will be understood herein that the machine described in the above patents is equipped with the improved total sensing and printing mechanism described in Patents No. 1,921,454 and 1,954,041 as applied to accumulators of the type described in Patent No. 1,307,740.

Since the cited patents fully describe the mechanism of the standard "International" accounting machine, only a very brief general description of a few of its parts will be given herein to show how the dividing machine is connected to and operates in conjunction with the standard accounting machine.

The tabulating machine

Figure 11A:
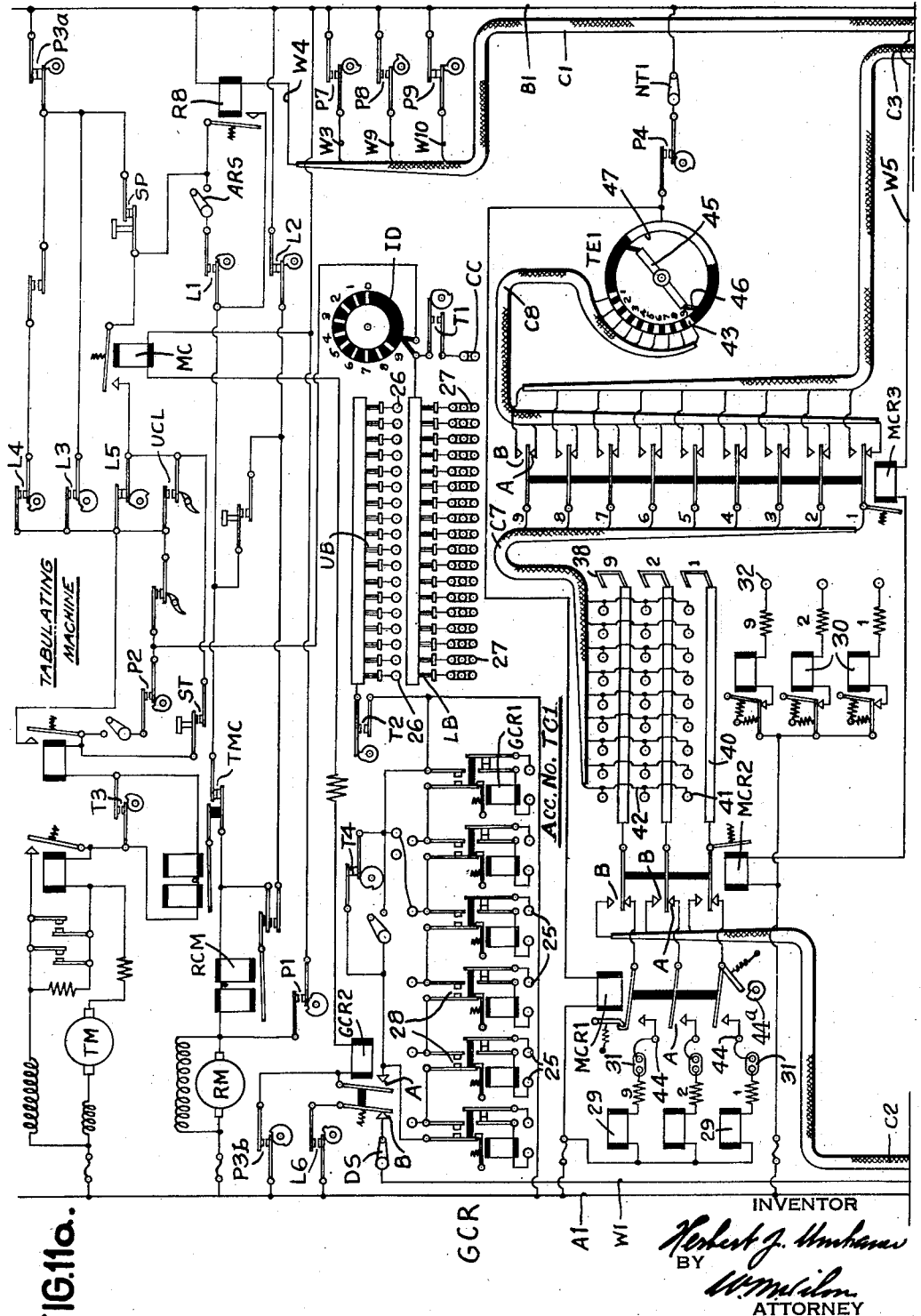

The tabulating machine proper is operated by two electric motors designated TM and RM in Fig. 11a which may be controlled substantially as described in Patent No. 1,762,145 except that an auxiliary control for the reset motor RM is provided in the dividing machine. This auxiliary control will be described at the proper point hereinafter. Tabulating motor TM drives the card feeding mechanism and item accumulating and item printing mechanism in the usual way. It also drives a number of control cam contacts designated L1 to L6 and T1 to T4, inclusive, the operating cams of which rotate once per card cycle and have the timing shown in Fig. 8 wherein the thick black lines indicate the period of closure. Motor TM also operates the usual impulse distributor ID at the rate of one revolution per card cycle. A start key ST and a stop key SP provide means for manually controlling the operation of the motor TM while automatic control thereof by the usual automatic group control mechanism is effected through a motor control relay MC.

The automatic group control mechanism may be identical with the one described in Patent No. 1,762,145 except in one respect, namely, the connections to line wires A1, B1 are the reverse of the connections shown in the patent. This has been done to simplify the diagram and facilitate circuit tracing.

The group control mechanism comprises a series of six group control relays GCR1 each of which may be plugged to upper and lower brushes UB and LB in the usual way through group control plug sockets 25, upper brush plug sockets 26, and lower brush triple plug sockets 27. These relays are partly mechanically operated as in Patent No. 1,822,594. Each relay GCR has a pair of contacts 28 which is closed whenever the relay coil is energized. As in the patent, these contacts 28 are reopened by cams at the end of each card cycle.
As the operation of this type of automatic control is well known and fully described in Patents No. 1,762,145 and No. 1,822,594 no detailed description will be given herein. For the purpose of understanding the present invention it will be assumed that the perforated record cards are arranged in groups according to group classification numbers comprising six digits. Under these circumstances the plug sockets 25 of each relay GCR1 will be plugged to the respective sockets 26, 27 corresponding to the column in which one of the digits of the group number is perforated in the record cards.

During a total taking and resetting cycle, contacts P3b close, energizing a minor control relay GCR2 by a circuit from line wire A1, contacts P3b, relays GCR2 and MC, to line wire B1. Contacts A of relay GCR2 close and a holding circuit for relay GCR2 is established through cam contacts T4 to line wire A1. As long as the group numbers on successive cards agree all of relays GCR1 which have been plugged will be energized during each card cycle closing their contacts 28 so that the opening of contacts T4 during the latter part of each card cycle (Fig. 8) will have no effect and relays GCR1 and MC will remain energized.

Motor control relay MC maintains the circuit for the motor TM so that feeding of cards continues as long as the usual card magazine is kept filled and the group numbers do not change. A disagreement of group control holes as a consequence of the end of a card group causes one or more of contacts 28 to remain open so that opening of contacts T4 during a card cycle interrupts the circuit for relays MC and GCR2. This causes the contacts of relay MC to open interrupting the circuit to motor TM with the net result that motor TM stops at the end of the card group. If as, will be assumed hereinafter, the usual automatic reset switch ARS is open, the tabulating machine proper will stop completely.

Figure 4:
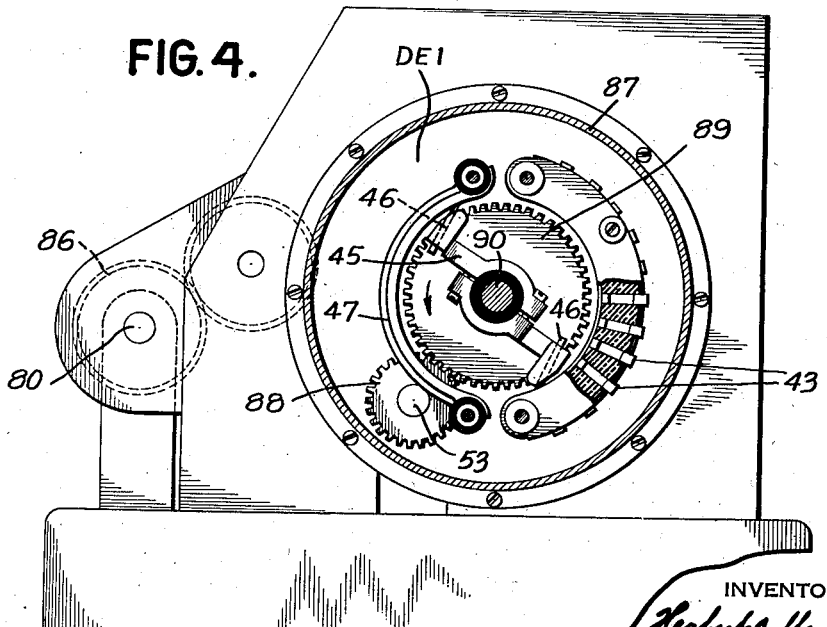
Fig. 4 is a vertical section through one of the emitters.

Motor RM drives the total taking and resetting mechanism during total taking and resetting cycles and also drives cams controlling certain cam contacts designated P1 to P9 at the rate of one revolution per reset cycle. The timing of these cam operated contacts is designated in Fig. 10 by the thick black lines which indicate the duration of closure. Motor RM also drives several tabulating emitters TE1 to TE3 at the rate of one revolution per reset cycle. These emitters are described in Patents No. 1,921,454 and No. 1,954,041 and are used to provide the impulses of current used in operating the usual printer magnets 29 for effecting the printing of totals as described in the last named patents. The mechanical construction of one of the emitters is illustrated in Fig. 4 which shows one of the dividing emitters which will be briefly described at the proper point hereinafter.

The printing mechanism may be identical with the one described in Patent No. 1,762,145 and is controlled by printer magnets 29. There is usually a group or "bank" of type bars for each accumulator, the machine being customarily equipped with five accumulators and five banks of type bars, the operation of each type bar being controlled by a single magnet 29. Both items and totals may be printed by means of the same bank of typebars.

Figure 2:
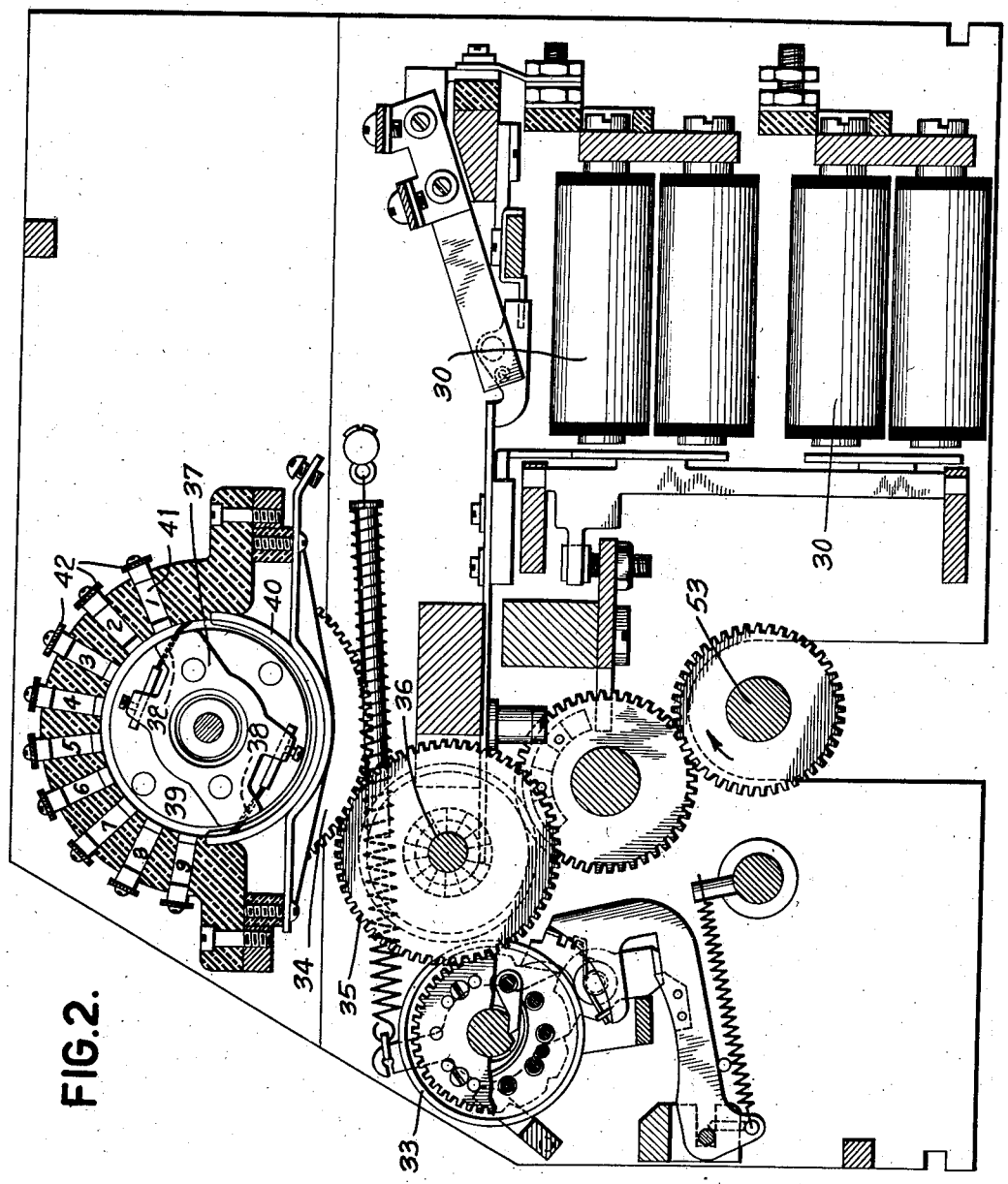
Fig. 2 is a vertical section through one of the accumulators and its top counter.

Only three of the accumulators in the accounting machine are required for use in connection with the division machine and are designated TC1, TC2, TC3 in Figs. 11a and 11b. Each accumulator includes a series of accumulator magnets 30 of which only three are shown for each of the three accumulators. The accumulators are like those described in Patent No. 1,921,454 and No. 1,954,041 and are illustrated in Fig. 2 which shows one of the accumulators in the dividing machine. The construction will be briefly described hereinafter at the proper point.

The printer magnets 29 may be plugged directly to the lower brushes LB by means of plug sockets 31 for the purpose of printing items from the cards and/or may be plugged to the total taking mechanism for the purpose of printing totals. Accumulator magnets 30 are connected to plug sockets 32 by means of which the accumulator magnets also may be plugged to the lower brushes LB for the purpose of accumulating items. The printer magnets 29 and accumulator magnets 30 of each accumulator are connected in a group to line wire A1 through fuses.

Associated with each accumulator is a read-out device which replaces the total sensing contacts described in Patent No. 1,762,145. Each read-out device of the accounting machine is shown diagrammatically above the corresponding group of accumulator magnets 30 and directly below the captions "Acc. No. TC1 divisor," etc., in Figs. 11a and 11b. One of the dividing machine read-out devices is shown in Fig. 2 and may be used for purposes of a brief description.

Each accumulator wheel 33 is geared to a large gear 34 through an intermediate gear 35 on the usual clutch shaft 36. Secured to each gear 34 is an insulated brush carrier 37 having two brushes 38 diametrically opposite the shaft 39 loosely supporting gears 34. Brushes 38 are electrically connected and adapted to wipe an arcuate common contact segment 40 and a series of nine insulated segments 41 each of which corresponds to one of the numerical values indicatable by accumulator wheel 33. The numerical values of the segments 41 are indicated by the small numerals 1 to 9 in Fig. 2. In other words, if the counter wheel 33 showed a "6" through the usual sight opening, one of brushes 38 would rest on the "6" segment 41 and the other brush on the common segment 40. The ratio of the gearing between counter wheel 33 and gear 34 is 1 to 2 so that brushes 38 alternate in electrically manifesting values accumulated by wheel 33.

All of the segments 41 of the same value are connected together by a bus bar 42 of which there are nine in all for each accumulator. The bus bars 42 of each accumulator are ordinarily directly connected individually to segments of the same values in the emitter TE1, TE2, etc., corresponding to that accumulator (Figs. 11a and 11b) In order to secure proper coordination of the dividing machine with the accounting machine proper, the respective groups of bus bars 42 of the accumulators TC1, TC2, TC3 are not directly connected to the segments 43 of the respective emitters TE1, TE2, TE3. Instead the bus bars are connected to the emitters by means of cables C7 to C12 and the contacts A of three multi-contact relays MCR3, MCR6, MCR9, respectively, so that normally the bus bars 42 are electrically connected to the emitters. Relays MCR3 and MCR6 are controlled by the dividing machine in a manner to be described hereinafter.

The common segments 40 of the respective accumulators are connected to plug sockets 44 through contacts A of pairs of multi-contact relays MCR1, MCR2; MCR4, MCR5; and MCR7, MCR8. Contacts A of the relays MCR1, MCR4, MCR8 and contacts B of relays MCR2, MCR5, MCR7 are normally open while contacts A of the last three are normally closed. Plug sockets 44 of each accumulator may be plugged to any desired group or bank of printing magnets 29 for the purpose of printing totals from any selected accumulator or part of an accumulator by any selected printing bank or portion of a printing bank. The relays MCR1, MCR4, MCR7, MCR8, and MCR9 are of the electro-mechanical type described in Patent No. 1,954,041 in which the relay coils release latches permitting the contacts A of relays MCR1, MCR4, MCR8 to close and contacts A of relays MCR7, MCR9 to open. A cam 44a on the usual resetting shaft restores the contacts of the relays to their normal position near the end of each resetting cycle.

Resetting of selected accumulators is accomplished by manually clutching the selected accumulators to the usual resetting shaft in a well known way. It will be assumed that accumulators TC1, TC2, TC3 have been clutched to the resetting shaft so as to be automatically reset during each resetting cycle of the tabulating machine.

The emitters TE1, TE2, TE3 are substantially the same as in Patent No. 1,954,041 and their construction is illustrated in Fig. 4 which shows one of the dividing emitters designated DE1, DE2 in Figs. 11c and 11d. Each emitter consists of a rotary brush holder 45 carrying two diametrically opposite brushes 46 one of which wipes over the segments 43 while the other is wiping over a common segment 47. Brushes 46 are electrically connected so that the effect of rotation of each emitter is to transmit differently valued electrical impulses from line wire B2 to the bus bars 42 in succession as the emitters rotate. This will be more fully explained hereinafter.

Emitters TE1, TE2, TE3 rotate at the rate of one revolution per resetting cycle but are only effective during the first half of such cycle owing to the timing of cam contacts P4, P5, P6 (Fig. 10). The emitters TE1, TE2, TE3 rotate in synchronism with the rising of the type bars during a resetting cycle, that is when a given numeral type is almost at the printing line one of the brushes 46 of each emitter will touch the segment 43 corresponding in value to such type. For example, as the "6" type of a given type bar is about to reach the printing line, one of the brushes 46 of each emitter will touch the "6" segment 43 of the emitter.

The lowest denominational order or "units" order of each accumulator and the associated printer magnet is indicated in Figs. 11a to 11e by the small numeral 1 to the right of printer magnets 29, accumulator magnets 30, and the common bars 40. The second or "tens" and the ninth or "100 000 000" denominational orders are similarly indicated by the numerals 2 and 9.

As an illustrative example, it will be assumed that the controlling records are arranged in groups identified by classification numbers and that each card group contains a record card having the divisor punched in a field different from the field containing the items.

The lower brushes LB sensing the item field will be plugged to the appropriate plug sockets 32 of accumulator TC2 (Fig. 11b) assigned to accumulating the dividend. This is done in the usual way by inserting plug wires between the proper plug sockets 27 and 32. To simplify the description it will be assumed that only totals are to be printed and the machine is set for tabulating operation by placing the usual "list-non-list" lever (not shown) in non-listing position. The brushes LB sensing the field in which the divisor is punched in one of the cards will be similarly plugged to accumulator No. TC1. With this arrangement the machine will operate automatically in the usual way to print the classification number of the first group, accumulate the items of the dividend in accumulator No. TC2, the divisor in accumulator No. TC1, and the motor TM will stop at the end of the group. At this point the dividing machine is to intervene automatically to compute the quotient before a resetting cycle takes place, accordingly the usual automatic resetting switch ARS will be kept in open position.

Total printing is accomplished during a resetting cycle in the following manner assuming as an illustration that "6" has been accumulated in the units order of accumulator TC1. Contacts P4 close early in the reset cycle (Fig. 10) and a circuit is established from line wire B1 (Fig. 11a), non-total switch NT1 (closed for automatic total printing), contacts P4 and relay MCR1, to wire A1. Contacts A of relay MCR1 close before one of the brushes 46 of emitter TE1 touches the "9" segment 43. At the "6" point in the cycle (see Fig. 10 also) a total printing circuit for the units order of accumulator TC1 is established from contacts P4 and segment 47 of emitter TE1 through brushes 46 to the "6" segment 43, cable C8, the "6" contacts A of relay MCR3, cable C7, "6" bus bar 42, "6" segment 41 of units order, brushes 38, units segment 40, contacts A of relays MCR2, MCR1, units printer magnet 29, to line wire A1. Similar operations take place for the other orders of accumulator TC1 at the proper points in the resetting cycle in accordance with values accumulated by such orders. During the last half of the resetting cycle the accumulators will be reset in the usual way. This results in a total being printed from accumulator TC1.

Up to this point the description has been confined to briefly describing the general construction and operation of a standard form of tabulating machine which has been selected for purposes of illustration on account of its simplicity. Actually other, more or less complicated machines may be used in conjunction with the dividing machine as the dividing machine does not in any respect interfere with the proper operation of the tabulating machine. Essentially the principal work required of the tabulating machine up to this point is to sense the record cards and enter the divisor and dividend in two different accumulators.

It will be understood that the tabulating machine proper may contain any of the usual devices and equipment for obtaining special results, such as class selection, balance selection and printing, multiple group control with or without successive total printing, and other features as the dividing machine does not in any way interfere with these devices. This is one of the novel features of the present invention and will be more clearly perceived after several illustrative examples and the manner of obtaining novel results have been fully explained.

Relays MCR2, MCR3, MCR5, and MCR6 are for the purpose of isolating the read-out devices of accumulators TC1, TC2 to enable the values accumulated in said accumulators to be transferred into suitable divisor and dividend accumulators in the dividing machine. Ordinarily, however, these relays are in a condition to enable normal operations to be carried on by the tabulating machine, but when energized switch the read-out devices to the appropriate accumulator magnets of the dividing machine. Relays MCR8 and MCR9 are solely for the purpose of transferring the quotient from the quotient accumulator of the dividing machine to accumulator TC3 of the tabulating machine. The contacts B of relays MCR2, MCR3, MCR5, MCR6, MCR7, MCR9 are connected to several cables C2 to C6 provided with suitable plug sockets 48 and multi-point plugs 49 by means of which the dividing machine may be plugged to the tabulating machine. Plug sockets 48 may be located on the usual plugboard of the tabulating machine or on a special plugboard attached to the tabulating machine.

Figs. 1 to 10 show the general mechanical construction of the dividing machine while Figs. 11c to 11e comprise a wiring diagram of the machine. In the wiring diagram the respective orders of the read-out devices, accumulator magnets, column shifter, and related devices are indicated by the small numerals 1 to 9. This will facilitate tracing circuits through the various cables connecting the accumulators, read-out devices, and other devices.

The dividing machine may outwardly resemble a tabulating machine in general appearance but is much simpler owing to the fact that there is lacking the usual card feeding mechanism, printing mechanism, and plugboard. The dividing machine is mounted on a base 50 provided with four legs 51. Power to drive the machine is furnished by a driving motor DM which will be termed the dividing motor hereinafter to distinguish it from the motors TM and RM which drive the tabulating machine.

Figure 3:
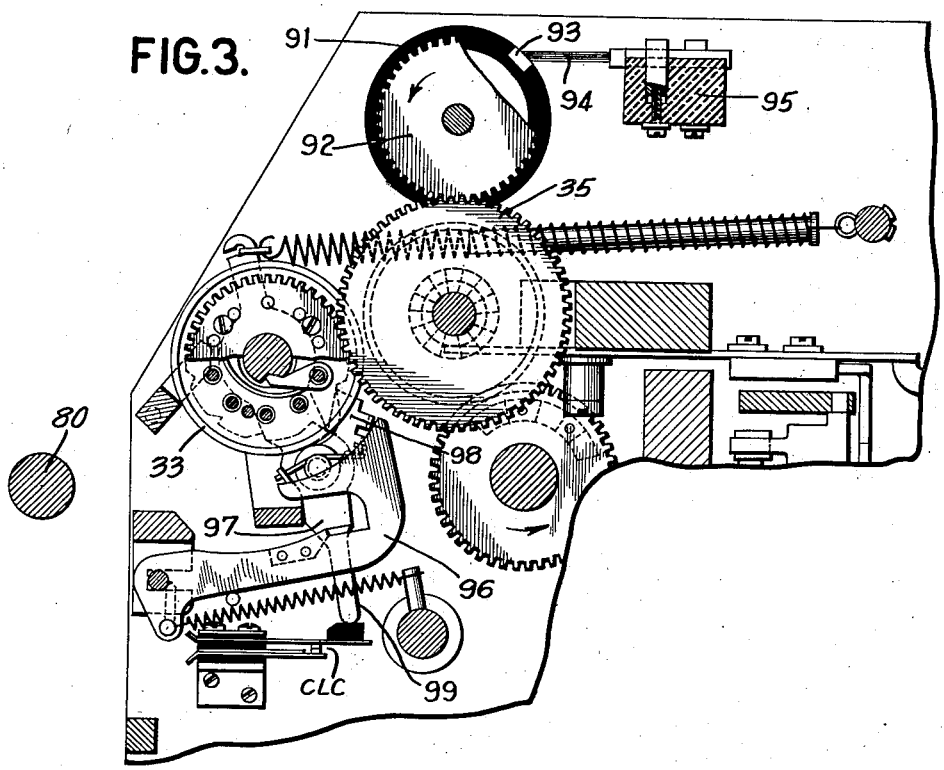
Fig. 3 is a vertical section through the dividend counter.

Mounted on the top of base 50 is a series of four dividing accumulators designated DC1 to DC4 which are for the quotient, dividend, the complement of the divisor, and the divisor as a positive number, respectively. The dividend accumulator DC2 is illustrated in Fig. 3 and may be identical with the one illustrated in Patent No. 1,307,740 except for the provision of auxiliary control commutators to be described hereinafter. The other three accumulators may be of the same general construction as in Patents Nos. 1,921,454 and 1,954,041. The construction of these accumulators has already been described briefly as a means of explaining the construction of the accumulators TC1, TC2, TC3, and for all practical purposes may be the same as in the patents. The dividing accumulators are not provided with the electromechanical relays shown in Patent No. 1,954,041. The accumulators may or may not be provided with indicating wheels 33 and sight openings 52, as desired, but it is preferred to provide them as it is a convenience in servicing the machine.

All four accumulators are driven in the usual way by a common shaft 53 (Fig. 2) and amounts are entered in them in the usual way under control of clutches operated by accumulator magnets 30 of which there is one for each accumulator wheel 33. Secured to the left hand end of shaft 53 (Figs. 1 and 5) is a disc 54 carrying a pivoted clutch pawl 55 of a conventional one-revolution clutch. Loosely mounted on shaft 53 adjacent disc 54 is a driven pulley 56 connected by a belt 57 to a driving pulley 58 on the drive shaft of dividing motor DM. Secured to pulley 56, as by means of a sleeve 59, is a driving ratchet 60. A spring 61 attached to disk 54 and pawl 55 tends to engage the pawl with said ratchet. A latch lever 62 pivoted at 63 has a hook portion engaging the tail of pawl 55 to prevent engagement of the pawl with the ratchet 60. The armature 64 of a drive clutch magnet DCM is secured to the left hand end of lever 62. When the drive clutch magnet is energized pawl 55 is released and engages ratchet 60 to establish a positive driving connection between pulley 56 and shaft 53.

Motor DM rotates constantly while the dividing machine is being operated in conjunction with the tabulating machine. The magnet DCM may be in series with motor DM through a motor switch MS (Fig. 11e) so that closure of such switch causes the motor to start and the one revolution clutch to engage simultaneously. When switch MS is opened to stop the dividing machine, the one revolution clutch causes the machine to stop always in a fixed position called the D position (Fig. 9).

Secured to shaft 53 is a small gear 65 meshing with a larger idler gear 66. The latter meshes with a gear 67 secured to a cam shaft 68 on which is secured twelve cams 69 each controlling contacts. These contacts are designated U1 to U12 in Figs. 9 and 11c to 11d. The cam actuated contacts U1 to U12 have the timing indicated in Fig. 9 in which the thick black lines show the periods of closure.

Figure 1:
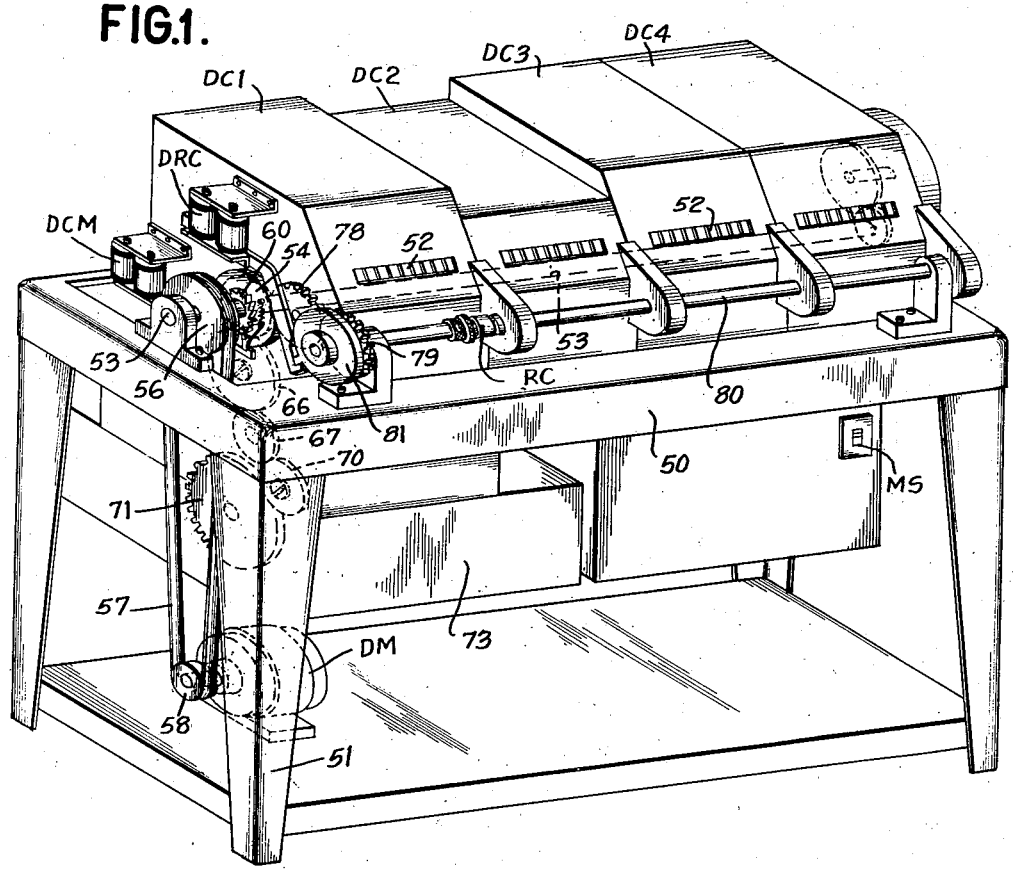
Fig. 1 is a perspective view of the machine.
Figure 5:
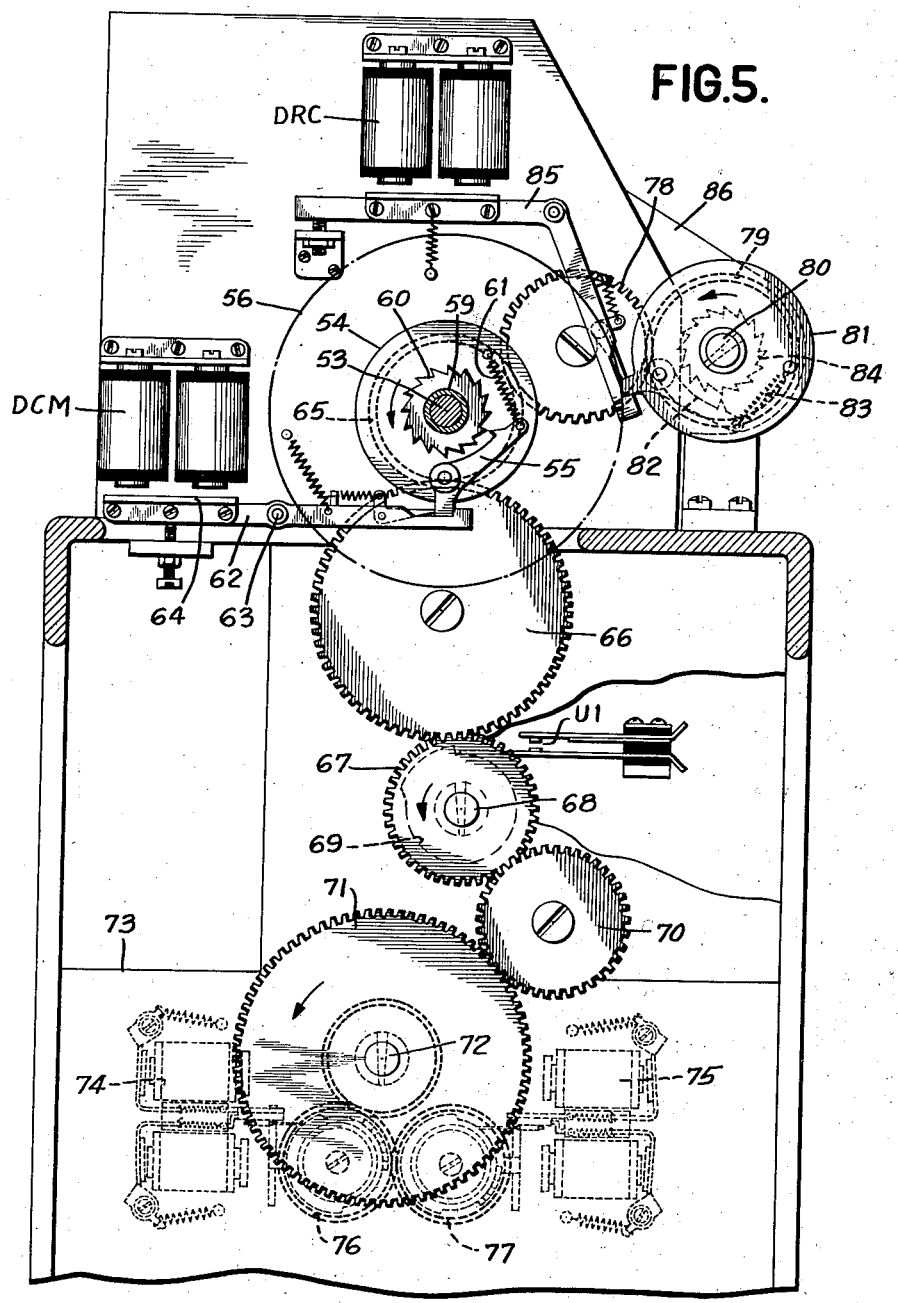
Fig. 5 is a vertical section showing the main driving connections of the machine.

Gear 67 meshes with an idler gear 70 which in turn meshes with a larger gear 71 secured to the shaft 72 of a translator generally designated 73 in Figs. 1 and 5 which translator may be like the one described in Patent No. 1,791,953. In the present case the translator 73 is used to convert the divisor, appearing as a positive number in the divisor accumulator DC1, into a complement which is stored in dividing accumulator DC3. The manner in which this conversion and transfer is effected by a transfer from accumulator TC1 to accumulator DC3 will be explained more fully at the proper point. The translator magnets 74, 75 and commutators 76, 77 in Figs. 5 and 11d have the same function and mode of operation as magnets 55, 56 and commutators 34, 36 in Patent No. 1,791,953. The portion of Fig. 11d enclosed in the rectangle formed by broken lines and designated 73 in Fig. 11d represents three numerical orders of the translator which are designated by the small numerals 1, 2, and 9 to represent the first or units, the second, or tens, and ninth or hundred millions order to correspond with the designation of other parts of the machine. The construction and mode of operation of the translator 73 will not be explained herein as it is now well known in the art and fully explained in Patent No. 1,791,953.

Gears 65 and 67 are of same size so that the cam shaft 68 rotates in synchronism with the main drive shaft 53. Gear 71 is twice the size of gear 67 so that shaft 72 turns one-half revolution for each revolution of shaft 53. This is necessary because, as explained in Patent No. 1,791,953, the translator emits complement impulses through commutators 76 (Fig. 11d) during the cycle immediately following energization of magnets 74 in accordance with a positive value so that positive numbers are emitted as complements during the cycle following the entry of the positive numbers in the translator.

Gear 65 meshes with an idler gear 78 which in turn meshes with a gear 79 loose on a resetting shaft 80 extending in front of all the dividing accumulators. Gear 79 may be connected to shaft 80 for driving purposes by means of a one revolution clutch identical with the clutch connecting pulley 56 to the main drive shaft. This clutch is controlled by a magnet DRC and comprises the clutch disc 81 secured to shaft 80, driving pawl 82 carried by said disc, spring 83 actuating the pawl, and a driving ratchet 84 secured to gear 79. Magnet DRC actuates a pivoted latch lever 85 to control pawl 82 in exactly the same manner as magnet DCM controls pawl 55. Shaft 80 corresponds to the usual resetting shaft provided in tabulating machines and usually driven by the motor RM. In the present case, as there is no need of selective resetting in the dividing machine, the reset control clutches usually provided for individually connecting the various accumulators to the reset shaft may be omitted, except as to accumulator DC1, and shaft 80 directly connected to the accumulator wheel shafts of all the accumulators DC2 to DC4, as by means of gears 86 (Fig. 4). These gears are covered by housings attached to or forming part of the cabinet enclosing the mechanisms of the dividing machine. A manually operable reset clutch RC (Fig. 1) of conventional form connects shaft 80 to the gears 86 of the accumulator DC1. It will be understood that when clutch RC is engaged a single revolution of shaft 80 will cause all the dividing accumulators to be reset to zero in the same way resetting is accomplished in the tabulating machine. The ratio between gears 65, 79 is unity so that resetting is accomplished in a single dividing cycle.

There are two dividing emitters designated DE1, DE2 in Figs. 11c and 11d. The emitter DE1 is shown in Fig. 4. The construction and operation of these emitters have already been described. They are mounted on the right hand end of the machine within a housing 87 and are driven by a small gear 88 secured to the right hand end of shaft 53. Gear 88 meshes with a gear 89 twice as large as gear 88 and secured to a short shaft 90 journalled in the framework on which shaft is insulatably mounted the brush holders 45 carrying the emitter brushes 46. The brush holders 45 of emitters DE1, DE2 rotate a half revolution per dividing cycle and have the same effect as emitters TE1, TE2, TE3 of the tabulating mechanism in controlling accumulator magnets. Emitters DE1, DE2 control the transfer of totals in accumulator TC1, TC2 to accumulators DC2, DC3, DC4 and the entry of the divisor positively or negatively in accumulator DC2 during dividing operations.

The dividend accumulator DC2 may be identical in general construction with the one described in Patent No. 1,307,740 but is provided with certain circuit closing devices which are utilized to control dividing operations. This accumulator, as stated before, is not equipped with a read-out device but in place of the read-out device there is provided a series of commutators 91 (Fig. 3) secured to gears 92. The latter mesh with the gears 35 of the dividend accumulator, the driving ratio being the same as for the accumulator wheels. In other words, the commutators 91 are rotated the same amount as the accumulator wheels when amounts are entered in the accumulator. Each commutator has a bar or segment of conducting material 93 adapted, when the associated accumulator wheel 33 indicates a zero through sight opening 52, to bridge a pair of brushes 94 mounted in a bar of insulating material 95. As shown in Fig. 11e, the pairs of brushes 94 are connected in series to close a circuit when all the accumulator wheels of the dividend accumulator DC2 indicate zero.

The commutator 91 of the highest order wheel of the dividend accumulator also has a second bar of conducting material 93a (Fig. 7) adapted to bridge a pair of brushes 94a also carried by bar 95 when the highest or ninth order wheel indicates "9."

Associated with the usual carry lever 96 (Fig. 3) between the two highest order wheels of the dividend accumulator DC2 is a pair of contacts CLC which may be called the carry lever contacts. The arm 97 on which is mounted the usual carry or transfer pawl 98 has an extension 99 normally bearing on a block of insulating material secured to one of contacts CLC so as to hold these contacts closed. When a carry is effected from the next-to-the highest to the highest order accumulator wheel of the dividend accumulator, the carry lever 96 is rocked downwardly to release arm 97 when then moves to the left permitting contacts CLC to open. When the carrying operation is completed and arm 97 restored by bail 100 in the usual way, contacts CLC are released. This restoring operation takes place near the end of each dividing cycle.

The description of the dividing machine so far has been confined mainly to the mechanisms driven by the dividing motor DM without reference to the manner in which the various mechanisms are coordinated by the electrical circuits to perform the operation of automatic division. The manner in which coordination is obtained and the operation of the machine with reference to several specific examples will now be described in detail.

An important element in the coordination of the various mechanisms operated by dividing motor DM is a device which may be aptly termed a column shifter. A suitable form of column shifter is illustrated in Fig. 6 but this is purely illustrative and diagrammatic in nature as this mechanism may take other and equivalent forms without affecting the results.

The column shifter includes a main frame comprising two parallel bars 101, 102 (Fig. 6) to which are secured two cross bars or guides 103 and a support plate 104. Slidably mounted in this frame, as in grooves 104a formed in the confronting edges of guides 103, is a rectangular frame comprising two bars 105 having tongues or ribs riding in the grooves 104 and a pair of bars 106 joining the ends of bars 105. Secured to the bar 105 nearest plate 104, as by means of several arms 107 is a ratchet feed rack 108. A coil spring 109, secured to a pin on one of the arms 107 and a pin on the adjacent bar 103, normally holds the slidable frame 105—106 in the position of Fig. 6 with the left hand bar 106 abutting several adjustable stops 110 carried by bar 101.

Feed mechanism is provided which is actuated by a column shift magnet CSM mounted on plate 104. This magnet actuates an arm 111 which is pivoted at 112 and normally held by a spring 113 against an adjustable stop screw 114 carried by a pin secured to plate 104. A feed pawl 115 pivoted to the free end of arm 111 is held by a torsion spring in engagement with the teeth of rack 108. A holding pawl 116, pivoted to plate 104 and actuated by another torsion spring, also normally engages feed rack 108. By means of this feed mechanism actuated by magnet CSM the slidable frame 105—106 and parts carried thereby can be given a step-by-step feeding movement to the right.

In order to restore the frame 105—106 to the starting position of Fig. 6, there is provided a column shift release magnet CSRM secured to plate 104. This magnet actuates a bell crank 117 pivoted to plate 104 at 118 and held by a spring 119 against a stop pin 120. One arm of the bell crank has a bent over lug adapted to engage the tails of both pawls 115, 116 when magnet CSRM is energized and free, both pawls from the rack thereby permitting spring 109 to restore the frame 105—106 to the position of Fig. 6.

Secured to frame 105—106 are three bars 121, 122, 123 which are provided with contact shoes or brushes 124, 125, 126 insulatably mounted on the respective bars. Bar 121 has a single contact shoe 124 while bars 122, 123 each have as many shoes as there are accumulator wheels in the quotient and divided accumulators DC1, DC2, respectively. As shown in Figs. 6 and 11c, it has been assumed that these accumulators have nine denominational orders but only four of the corresponding accumulator magnets 30 have been shown in Fig. 11c to simplify the drawing. The ones shown are the first or units order, and the second, eighth, and ninth or highest orders.

The contact shoes may be connected to a multicontact relay CSR and other parts of the electrical system by means of flexible wires and a cable C16 which do not interfere with movement of frame 105—106. Relay CSR will be termed the column shift relay hereinafter.

Secured to the bars 101, 102 are three bars 127, 128, 129 each of which has as many insulated contact buttons or segments 130 as there are denominational orders in accumulators DC1, DC2. Segments 130 of bars 127, 128 are connected in multiple directly to the accumulator magnets 30 of counter DC1 by means of a cable C13 (Fig. 11c). For example, the "1" segments of bars 127, 128 are both connected to the units accumulator magnet 30 of accumulator DC1. The segments 130 of bar 129 are similarly connected to the magnets 30 of accumulator DC2 through cables C14, C15 and the contacts A of a shift relay SR. Relays SR and CSR may be of the same type as the relays MCR2, MCR3, MCR5, MCR6, that is, the contacts are operated solely by their magnets and not partly by cams as in the case of relay MCR1.

The column shifter has a series of control contacts designated CS1 to CS5 which are directly operated by the frame 105—106. These contacts are operated by fingers 131 (Fig. 6) secured to bars 106 and having buttons or pins of insulating material. CS1 and CS5 are closed and open, respectively when the frame 105—106 is in the starting position of Fig. 6 and their status is reversed when the frame 105—106 is moved one step to the right. CS2 are opened and CS3, CS4 closed when frame 105, 106 is moved the last step by magnet CSM. Adjustable stops 132 on the bar 102 prevent over running of the frame 105—106 and possible damage to contacts CS2, CS3, CS4.

The relation of the contact shoes 126 to their respective segments is such that with the frame 105—106 in the starting position of Fig. 6, a five digit number can be entered into the five highest orders of the dividend accumulator DC2 either positively or negatively as a complement. At the same time one unit can be entered positively in the fifth order of accumulator DC1 through the contact shoe 124. Contact shoes 125 control the entry of the complement of "1" whereby to effect subtraction of a unit from the fifth order of said accumulator. The manner in which this is done will be explained more fully hereinafter.

It will be assumed that the tabulating machine has been started in the usual way and is feeding punched cards and the machine plugged as described above which will result in the items on the cards being accumulated in accumulator TC2 as the dividend, while the divisor will be accumulated in accumulator TC1. Clutch DRC is manually locked in engaged position. Switch MS has been closed so that the main shaft 53, the emitters DE1, DE2; cam shaft 68, and the translator 73 are all operating continuously. It will also be assumed that the column shifter is in the position of Fig. 6 and the dividend accumulator DC2 has been cleared and now stands at zero. This permits current to flow from line wire B2 (Fig. 11e) through all the commutators 91 in series, relays R3 and R4, and contacts CS1, to line wire A2. This circuit is maintained during the time the first group of cards is being fed through the tabulating machine.

Since the group control relay GCR2 is kept energized by the fact that all the cards of the first group have the same group number contacts B of this relay remain open. This prevents energization of relay R1 through contacts L6 which close at the end of each card cycle (Fig. 8). Consequently, contacts U1, closing once per revolution of shaft 53 (Fig. 9) cannot energize relay R2 (Fig. 11e) and contacts B of this relay remain open. This prevents circuits from being established by emitter DE1 (Fig. 11c) over wire W5 of cable C1 and the emitter merely rotates idly. The multi-contact relays MCR2, MCR3, MCR5, MCR6, which are connected to wire W5 also remain deenergized. The emitter DE2 also rotates idly as the contacts of relay R4 are opened to prevent energization of relay R5 by cam contacts U4 and the contacts B of relay R5 must be closed before the emitter DE2 can function.

The only circuit maintained in the dividing machine while cards are being fed is the one just described through relays R3, R4. Once each revolution of shaft 53 contacts U3 shunt the commutators 91 but this has no effect on relays R3, R4. Thus the dividing machine merely operates idly while the cards are being fed, sensed by the lower brushes LB, and the values thereon accumulated in counter TE1, TE2 in the usual way.

During the last card cycle of the first group, relay GCR2 (Fig. 11a) is deenergized due to the change in group number causing contacts B of this relay to close. The contacts L6 close at the end of this same cycle (Fig. 8) and a circuit is established as follows: Line wire A1 (Fig. 11a), contacts L6, contacts B of relay GCR2, switch DS (closed for dividing operation), wire W1, relay R1 (Fig. 11e), and contacts C of relay R3, to line wire B2. Contacts A of relay R1 establish a holding circuit for this relay direct to line wire A2.

Contacts B of relay R1 close to permit contacts U1 to initiate dividing operations of the dividing machine. Contacts U1 close near the end of a dividing cycle and energize relay R2 by a circuit from line wire A2, contacts B of relay R1, contacts U1, relay R2, and contacts C of relay R3 to line wire B2. Contacts B of relay R2 connect contacts U2 to line wire B2 through contacts B of relay R3. Naturally, since motors TM and DM are not synchronized and, if the tabulating machine is operating to print items, motor DM may be operating at a higher speed than motor TM, the point in the rotation of shaft 53 at which contacts B of relay R1 are permitted to close will vary but the point of initiating operation of the dividing machine will be fixed by the timing of cam contacts U1. Thus, under the very worst condition possible, less than a full cycle of shaft 53 will take place before contacts U1 close to prepare the dividing machine for its first full cycle of operation.

Contacts U2 close early in the cycle following closure of contacts U1 and render the emitter DE1 and multi-contact relays MCR2, MCR3, MCR5, MCR6 effective to cause the transfer of the totals in accumulators TC1 and TC2 to accumulators DC4, and DC2 respectively, as positive numbers. The closure of contacts B of relays R2, R3 and U2 makes wire W5 of cable C1 live.

Referring to Fig. 11a, this causes relays MCR2, MCR3 to become energized closing contacts B of relays MCR2, MCR3 which connect the accumulator magnets 30 of accumulator DC4, the readout device of accumulator TC1, and dividing emitter DE1 in series between wire W5 and line wire A2 through cables C2, C7, C3.

During the first full dividing cycle, the emitter DE1 functions to cause the transfer of the total on accumulator TC1 to accumulator DC4 by selectively energizing accumulator magnets 30 of the latter under control of the read-out device of accumulator TC1. This control of magnets 30 of accumulator DC4 by emitter DE1 is effected in exactly the same fashion as the printer magnets 29 are operated by emitters TE1 and so on during normal total printing operations of the tabulating machine. This has already been briefly described.

Cable C2 has a branch connected to the commutators of the translator 73 (Fig. 11d). This has the effect of placing the translator magnets 74 or 75 in parallel with the corresponding magnets 30 of accumulator DC4 with the result that the divisor is entered in the translator. The latter is thus controlled as described in Patent No. 1,791,953 so that a complement of the divisor can be entered in accumulator DC3 under control of commutators 76 or 77 during the second full dividing cycle.

The accumulator TC2 is somewhat similarly connected to emitter DE1 through a cable C4 and a branch of cable C3. Relays MCR5, MCR6 cause accumulator magnets 30 of dividend accumulator DC2, the contacts A of relay SR, the read-out device of accumulator TC2, and emitter DE1 to be connected in series so that the dividend is transferred from accumulator TC2 to accumulator DC2 during the first full dividing cycle. Relay SR, which is connected to wire W5 has the effect of switching the read-out device of accumulator TC2 to magnets 30 of accumulator DC2. No transfer takes place with respect to accumulators TC3 and DC1 as relays MCR7, MCR8, MCR9 are operative only during a resetting cycle of the tabulating machine.

The entry of the dividend in accumulator DC2 causes some or all of the commutators 91 to turn from zero position thus breaking the circuit from line wire B2 to contacts A of relay R3. The cam contacts U3, however, hold the circuit for such relay until near the end of the first full cycle whereupon relays R3, R4 are deenergized by the opening of such cam contacts (Fig. 9). This has the effect of disconnecting the emitter DE1 which cannot again be effective until a new series of dividing cycles is initiated. Relays R1, R2 also become deenergized.

The circuit through relay R4 is broken by contacts U3 after contacts U4 have opened (Fig. 9) so that relay R5 will remain deenergized until the "11" point of the second dividing cycle. During this second cycle the translator commutators 76 or 77 will cooperate to enter the divisor in accumulator DC3 as a complement through cable C19. The emitters DE1, DE2 have no effect during this second cycle because contacts B of relays R3, R5 are both open. Near the end of the second cycle contacts U4 close energizing relay R5 by the following circuit: Line wire A2 (Fig. 11e), contacts CS2, relay R5, contacts U4, contacts of relay R4 (now closed), wire W10 of cable C1, and contacts P9 (Fig. 11a), to line wire B1. Contacts A of relay R5 and contacts P9 keep this relay energized until the next cycle of the total taking and resetting mechanism for the tabulating machine takes place. This will not occur until after dividing operations are complete. Contacts B of relay R5 connect emitter DE2 to line wire B2 through wire W6 of cable C1 (see Fig. 11d).

The bus bars 42 of the read-out devices of accumulators DC3, DC4 are connected in parallel by cable C21 (Fig. 11d), while the two groups of common contact segments 40 of these accumulators are connected by cables C17, C18 to the contacts A, B, respectively, of relay CSR. Since the emitter DE1 is constantly driven by shaft 53, the emitter will cause impulses to be transmitted to the bus bars 42 of both accumulators DC3, DC4. These impulses from emitter DE2 will normally go to the dividend accumulator through the cables C20, C21, the read-out device of accumulator DC3, cable C17, and contacts A of relay CSR unless such relay is energized. In the latter case, the current impulses will go through cable C20, the read-out device of accumulator DC4, cable C18, and contacts B of relay CSR. In brief, the divisor will normally be subtracted from the dividend and will be added to the dividend only when relay CSR is energized. The column shifter, through contact shoes 126 and segments 130 connected to cable C15 determines which denominational orders of accumulator DC2 as represented by magnets 30 receive the impulses of current transmitted by the emitter DE2.

At the end of the second full dividing cycle the condition of the machine will be as follows: The dividend, complement of the divisor, and divisor will have been entered in accumulators DC2, DC3, DC4 in the order named; the emitter DE2 will be potentially effective; the column shifter will be in the position of Fig. 6 in readiness to enter the divisor positively or negatively in the five highest denominational orders of the dividend accumulator DC2; relay CSR will be deenergized to cause the divisor to be entered in accumulator DC2 negatively as a complement.

The principle on which the present invention is based is the progressive subtraction of the divisor from the dividend, beginning with a predetermined number of the highest orders, and shifting the subtraction to the next lowest order when the amount remaining on the predetermined orders is less than the divisor. The quotient is obtained by counting the number of subtraction operations necessary to reduce each group of orders in the dividend accumulator to zero or to a positive value less than the divisor.

The following description will assume that the divisor does not exceed five digits and accordingly the column shifter has been shown as starting with the five highest orders of the dividend accumulator DC2.

During the third and perhaps a certain number of following cycles the divisor will be substracted from the five highest orders of accumulator DC2 over circuits which may be traced in the following manner: Line wire B2 (Fig. 11e), contacts B of relay R5, wire W6 of cable C1, emitter DE2 (Fig. 11d), cable 20, bus bars 42 of accumulator DC4, cable 21, bus bars 42 of accumulator DC3, the proper brushes 38 of accumulator DC3, cable C17, contacts A of relay CSR (Fig. 11c), cable C16, the five shoes 126 bearing on segments 130 associated with the five highest orders of accumulator DC2, cable C15, contacts A of relay SR, cable C14, the accumulator magnets 30 of the five highest orders of dividend accumulator DC2, to line wire A2.

Each time the divisor is subtracted from accumulator DC2, a unit is added in the fifth order of quotient accumulator DC1 over the following circuit: Wire W6 (Fig. 11c), remembering that this wire is "live," contacts E of relay CSR, contacts U10 (which are closed at "1," Fig. 9), shoe 124 and the segment 130 associated with the fifth order of accumulator DC1, cable C13, the magnet 30 for the fifth order of accumulator DC1, to line wire A2.

Contacts U11 are open at the "1" position of a dividing cycle (Fig. 9) and prevent the impulse of current through shoe 124 to the fifth order magnet 30 from also energizing the other magnets 30 of accumulator DC2 by way of the branch of cable C13 and shoes 125.

The described operation continues until the amount standing in the five highest orders of accumulator DC2 has been converted to a complement due to the five orders being reduced to zero by a previous cycle or by the amount being less than the divisor resulting in a complement remaining after the complement of the divisor has been added to the five orders. When this occurs, the commutator 91 of the highest order of the dividend accumulator DC2 will be turned to the "9" position.

This causes a circuit to be established as follows: line wire A2 (Fig. 11e), relay R6, contacts U5 (closing during the cycle in which the commutator 91 turns to "9"), brushes 94a and segment 93a, carry lever contacts CLC, to line wire B2. Relay R6 closes its contacts to permit establishment of a circuit from line wire A2, relay R6, contacts of said relay, contacts U6, wire W8 of cable C1, relay CSR (Fig. 11c), to line wire B2. During most of the cycle that follows the one in which the amount in the dividend accumulator is changed to a complement, the contacts B of relay CSR will be closed. As a result the divisor will be entered positively in accumulator DC2 through the read-out device of accumulator DC4 and cable C18 thereby changing the amount in the five highest orders of accumulator DC2 back to zero or to the same positive number less in value than the divisor which was formerly in the five highest orders.

During this last described cycle, the complement of "1" will be added to the quotient accumulator due to closure of contacts D. These contacts permit a number of circuits to be established at "9" in the cycle through all the accumulator magnets 30 of the five highest orders of accumulator DC2. These circuits may be generally traced as follows: Wire W6 (Fig. 11c), contacts D of relay CSR, contacts U9 (closed at "9," Fig. 9), contacts U11; the shoe coacting with segment 130 of the fifth order of accumulator DC2, also directly to the other four shoes coacting with segments 130 of the sixth to ninth orders respectively; cable C13, the accumulator magnets 30 of the five highest orders of accumulator D2, to line wire A2. The closure of contacts U9 at "9" has the effect of adding "99999," which is the complement of "1," to the quotient accumulator; in other words, a unit is subtracted from the fifth order wheel of accumulator DC1.

The addition of the divisor in accumulator DC2 causes the "9" on the highest wheel to change to "0" by the operation of the usual carry mechanism. Before the carry takes place, however, the carry lever 96 (Fig. 3) is operated to cause contacts CLC to open. This permits the circuit through relay R6 to become broken when contacts U6 open near the end of the cycle.

When contacts U7 close during the cycle in which relay CSR is energized, relay R7 is energized by a circuit as follows: Line wire A2 (Fig. 11e), relay R1, contacts U7, wire 7 of cable C1, contacts C of relay CSR (Fig. 11c), to line wire B2. Before the contacts U7 reopen (Fig. 9), contacts U8 close and energize the column shifter magnet CSM through the coil and contacts of relay R7 (Fig. 11e). This causes the frame 105—106 (Fig. 6) to move one step to the right so that shoe 124 rests on the segment 130 associated with the fourth order of accumulator DC1 and the lowest shoes 125, 126 in Fig. 11c now rest on the segments 130 corresponding to the fourth orders of accumulators DC1, DC2. The opening of contacts U6 causes deenergization of relay CSR.

The machine will now commence to subtract the divisor from the fourth to ninth orders of accumulator DC2 by another series of cycles like those just described. During the last of this series of cycles, the divisor will be added as a positive number to correct for the over draft caused by adding the complement once more than is required, and the column shifter frame 105—106 will be shifted one more step to the right (Fig. 6).

After five series of dividing cycles, the fingers 131 will reach a position where the column shifting impulse through magnet CSM occurring during the last cycle of the last series will cause frame 105—106 to move one step to the right (Fig. 6) to close contacts CS3, CS4 and open contacts CS2. This causes the operation of the dividing machine to become interrupted so far as further adding or subtracting of the divisor is concerned and signifies that dividing operations are complete.

The opening of contacts CS2 deenergizes relay R5 and has the effect of rendering emitter DE2 ineffective. Closure of contacts CS4 causes the automatic starting of the resetting motor RM when contacts U12 close near the end of the last cycle of the last series. The starting circuit is as follows: Line wire A2, contacts CS4 (Fig. 11e), contacts U12, wire W4 of cable C1, relay R8 (Fig. 11a), to line wire B1. The closure of the contacts of relay R8 causes the reset motor RM to start by a circuit as follows: Line wire A1, motor RM (Fig. 11a), reset motor clutch magnet RCM, tabulating motor clutch contacts TMC, contacts of relay R8, stop key contacts SP, contacts P3a, to line wire B1. A reset cycle of the tabulating machine takes place in exactly the same fashion as if started by contacts L1 in the usual way.

When switches S1, S2 are in the position of Fig. 11b, the closure of contacts P6 at the beginning of the reset cycle causes relays MCR7, MCR8, MCR9 to become energized. The circuit for relays MCR7, MCR8, MCR9 extends from line wire A1, switch S1, the coils of relays MCR7 and MCR8, switch S2, coil of relay MCR9, contacts P6, and switch NT3, to line wire B1. Relays MCR1 and MCR4 will also be energized by two parallel circuits, between line wires A1, B1, one through switch NT1, contacts P4 and the coil of relay MCR1, and the other through switch NT2, contacts P5 and the coil of relay MCR4. This switches the read-out device of accumulator DC1 into series with tabulating emitter TE3 and the magnets 29 of the bank devoted to printing the quotient, the circuits extending from emitter TE3, through cable C12 (Fig. 11b), contacts B of relay MCR9, cable C6, the read-out device of accumulator DC1 (Fig. 11c), cable C5, contacts B of relay MCR7, plug wires 31, and printer magnets 29, to line wire B1. Thus the quotient will be printed under control of the read-out device of accumulator DC1. The divisor and dividend will also be printed during this cycle, provided switches NT1, NT2 are closed, since relays MCR2, MCR3, MCR5, MCR6 were deenergized when contacts U2 opened during the first full dividing cycle. If the tabulating machine is set to print items and totals (listing operation) the divisor, dividend, and quotient will appear on the same line after the last item provided switches NT1, NT2, NT3 are all closed. If set to print totals only (tabulating operation), the group number, divisor, dividend, and quotient will appear on the same line.

During the last half of the reset cycle, after the totals have been printed, contacts P7 close (see both Figs. 10 and 11a) to cause the resetting of the dividing machine accumulators by a circuit as follows: Line wire A2, magnet DRC (Fig. 11e), contacts CS3, wire W3 of cable C1, and contacts P7 (Fig. 11a) to line wire B1. Contacts P8 also close to effect restoration of the column shifter to the Fig. 6 position by a circuit as follows: Line wire A2, magnet CSRM (Fig. 11e), relay R9, wire W9 of cable C1, contacts P8 (Fig. 11a), to line wire B1.

The energization of the magnet DRC causes the one revolution clutch connecting shafts 53 and 80 to engage and reset to zero all the dividing machine accumulators DC1 to DC4. The contacts of relay R9 establish a holding circuit for such relay to line wire B2 through contacts CS5 which are closed when the column shifter frame 105—106 makes its first step of movement to the right (Fig. 6). As a result, pawls 115, 116 (Fig. 6) will be disengaged from feed rack 108 to permit spring 109 to restore the frame to the position of Fig. 6. When this occurs, contacts CS5 open to break the circuit through relay R11 and magnet CSR. Contacts CS1 also reclose to permit subsequent reenergization of relays R3, R4. CS2 reclose but have no effect as contacts A of relay R5 and contacts U4 are both open. Early in the resetting cycle, the contacts P3b close and reenergize the group control relay GCR2. Near the end of the reset cycle contacts P2 close to automatically restart the tabulating motor TM to feed, accumulate, and/or list the items of the second card group. Relays R3, R4 are reenergized as soon as the dividend counter DC2 is reset to zero due to commutators 91 being turned back to current conducting position.

Since the dividing machine does not have type bars and other reciprocating parts liable to limit the safe operating speed of the machine, it may be operated at a high speed, at least as fast, if not faster than the tabulating machine. Thus, in spite of the fact that a fair number of cycles may be required to perform the operation of division, it is probable that on the average considerably less time will be required to perform the operation of division than to feed the cards of a group.

It may be desired to operate the machine in such a fashion as to accumulate a grand total of the quotients. This is easily done by manually disengaging clutch RC to prevent resetting of accumulator DC1 which will then accumulate a progressive or running total of the quotients of the different card groups. Provided switch NT3 is closed, a progressive total of the quotients will be printed by each operation of the total taking mechanism. If this progressive total is not desired, switch NT3 can be opened to prevent printing of the quotient. In order to print the grand total of all the quotients, stop key SP may be depressed during the feeding of the last card group. This permits contacts L5 to stop motor TM and hence the feeding of cards ceases. Clutch RC can then be locked in engaged position, switch NT3 closed, and key ST depressed to restart the tabulating machine. As relay GCR2 is not affected by stopping the machine by means of key SP, the dividing machine will not be affected.

If the card groups are very small, say they comprise a single card with both divisor and dividend punched therein, or two cards are used, one for the divisor and one for the dividend, it may be found difficult to follow the above procedure due to the speed of the tabulating machine. In such cases the switch NT3 and clutch RC can be operated as soon as the tabulating machine stops at the end of the last group.

Whichever of the above methods is followed, the last operation of the total taking and resetting mechanism occurring at the end of the batch of cards will cause the grand total of the quotients to be printed and accumulator DC1 reset exactly as first described.

The above modified operation of the dividing machine gives an excellent example of the flexibility of the machine. The divisor and dividend may be entered in accumulators TC1, TC2 in various ways. The divisor and dividend can be punched in two different fields of a single card, or in different fields of two separate cards, or either may be derived by accumulation of items from a plurality of cards representing components of the divisor and/or the dividend.

It will be observed that the dividing machine does not interfere in any respect with the normal operation of the tabulating machine. Consequently, the flexibility of operation of the tabulating machine is not impaired, making it possible to secure various novel results not readily obtainable by means of machines heretofore known in the art. One of these results is the computing of averages which is of considerable value in census and general accounting and statistical work.

As an illustration of both the flexibility of the machine and the ability to compute averages it will be assumed that a bank wishes to determine the actual average daily balances of its checking account customers in order to fix the service charges and also to ascertain, if possible, the accounts which are unprofitable. Accordingly, cards are punched to show the daily balances, there being a card to shown the balance on each day of each customer's account over an arbitary period, say one month. The cards are arranged in groups by account numbers and the automatic group control is plugged to operate in accordance with the account numbers.

Accumulator TC2 is plugged to the lower brushes sensing the field of the cards devoted to the daily balances while the units order accumulator magnet 30 of accumulator TC1 is plugged to the card counting plug socket CC (Fig. 11a). This plug socket is connected to cam contacts T1 which close at "1" (Fig. 8) and by closing at this point transmit an impulse to the units magnet 30. This impulse has the same effect as if a unit had been added under control of a "1" hole in each card. Accumulators TC1, TC2, TC3 will, as before, be manually clutched to the resetting shaft to cause these accumulators to be automatically reset at the end of each card group.

With this arrangement, accumulator TC1 will count the number of cards in each group while the daily balances will be accumulated in accumulator TC2. At the end of each group the operation of division will be initiated and performed exactly as described above with the total of the balances for a given number of days as the dividend and the number of days, represented by the number of cards, as divisor. The quotient will represent the average daily balance for the period under consideration.

In a similar way the machine may be used to determine average ages, weights, and the like, average number of sales, average costs, average income or loss, and a multitude of others.

The dividing machine is easily applied to machines having special control features such as multiple group control, class selection, balance selection, and so on since the means by which the dividing machine is coordinated with the tabulating machine are essentially very simple and do not interfere with the proper operation of any of these or other special devices. The divisor and/or dividend may be entered in accumulators TC1, TC2, by known methods of class selection or balance accumulation or by various methods of plugging the tabulating machine.

It is quite possible that in some cases it may be desired to incorporate the dividing machine in the tabulating machine to obtain unity of construction and to save floor space. This may be easily done without material change in the construction and/or operation of either the dividing mechanism or the tabulating machine.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a dividing machine, a pair of accumulators for the divisor, an accumulator for the dividend, means for entering the divisor positively in one of the accumulators of said pair, means to enter the divisor negatively in the other accumulator of the pair, a readout mechanism controllable by either accumulator of the pair, said readout mechanism being adapted to enter the divisor positively or negatively in the dividend accumulator once for each cycle of operation, a switching device adapted when operated to place the readout mechanism under control of the positive divisor accumulator, said switching device normally causing the readout mechanism to be controlled by the negative divisor accumulator, a column shifter operable to cause the entries in the dividend accumulator to be made in successive orders of the dividend accumulator, an overdraft device controlled by the dividend accumulator and operative to cause operation of the switching device when an overdraft occurs, and means controlled by the switching device for operating the column shifter.

2. In a dividing machine, a pair of divisor accumulators, means to enter a divisor positively in one of said accumulators, means to enter the divisor negatively in the other, a dividend accumulator, means to enter a dividend in the dividend accumulator, read-out mechanism for the divisor accumulators; a selector device for normally connecting the negative divisor accumulator to the dividend accumulator whereby the read-out mechanism repeatedly transfers the divisor negatively to the dividend accumulator in successive cycles of the machine, said selector device being operable to connect the positive divisor accumulator to the dividend accumulator whereby to accumulate the divisor positively in the dividend accumulator; a column shifter operable to cause the readout mechanism to transfer the divisor to selected orders of the dividend accumulator, means controlled by the dividend accumulator to sense an overdraft in the dividend accumulator for controlling the operation of the selector device, and means controlled by the selector device for controlling the column shifter.

3. In a dividing machine, a pair of divisor accumulators, one for receiving the divisor positively and the other for receiving the divisor negatively, and a dividend accumulator, each accumulator including a series of accumulator magnets; means to operate the accumulator magnets to enter the divisor and dividend in their respective accumulators, including means to cause the divisor to be entered negatively in the negative divisor accumulator, electrical read-out circuits for the divisor accumulators, a switching device for selectively connecting the read-out circuits to the dividend accumulator magnets, said switching device being operable to cause the dividend accumulator magnets to be controlled by the positive divisor accumulator through the read-out circuits and normally causing the dividend accumulator magnets to be controlled by the negative divisor accumulator; and overdraft sensing means controlled by the dividend accumulator for controlling the operation of the switching device, said overdraft sensing means causing the switching device to connect the positive divisor accumulator to the dividend accumulator magnets through the read-out circuits when an overdraft occurs.

4. In a dividing machine, a pair of divisor accumulators, means for entering a divisor positively in one of said accumulators, means for entering the divisor negatively in the other of said accumulators; a dividend accumulator, means to enter the dividend in the dividend accumulator, electrical readout means for reading-out the amounts in said divisor accumulators to the dividend accumulator, including transfer circuits, electrical contact means in said circuits controlled by the divisor accumulators, and an impulse emitter operable in cycles and common to the transfer circuits of both readout means; a selective switching device connecting the entering means for the dividend accumulator to the transfer circuits of the divisor accumulators and normally rendering the contact means of the negative divisor accumulator effective to control the entering means for the dividend accumulator through impulses emitted by the emitter, and a cycle controller controlled by the dividend accumulator and operable to render the switching device effective to connect the contact means of the positive divisor accumulator to the entering means for the dividend accumulator when an overdraft occurs in the dividend accumulator.

5. In combination, a machine controlled by records arranged in groups and an auxiliary dividing machine; said record controlled machine comprising divisor and dividend accumulators, a quotient manifesting device including a series of elements settable to represent the digits of a quotient and including means to set said elements, means to enter a divisor and a dividend in their respective accumulators under control of said records, means to cause a transfer of the computed quotient from the dividing machine to the quotient manifesting device, and means to detect a change in group; said dividing machine comprising divisor, dividend and quotient accumulators, means to transfer the divisor and dividend from the divisor and dividend accumulators in the record controlled machine to the corresponding accumulators in the dividing machine, means controlled by the group change detecting means to initiate operation of the divisor and dividend transferring means. means to compute the quotient under control of the dividing machine accumulators including means to enter the quotient in the quotient accumulator, means in the record controlled machine to place the setting means and transferring means in the record controlled machine under control of the quotient accumulator, and means in the dividing machine controlled by the quotient computing means for initiating operation of the transferring means and the setting means to set said elements to represent the quotient upon the termination of quotient computing operations.

6. In a machine of the class described, a pair of divisor retaining means, a dividend accumulator, means to enter a divisor positively in one of the retaining means and a dividend in the dividend accumulator, means to enter the divisor negatively in the other of the retaining means, mechanism for transferring the divisor from one or the other of the retaining means to the dividend accumulator; a subtraction control device for controlling the transferring mechanism, said control device normally causing the divisor to be repeatedly transferred from the negative divisor retaining means to the dividend accumulator in successive cycles of the machine and operable to cause the divisor to be positively transferred from the positive divisor retaining means to the dividend accumulator; and means to detect an overdraft in the dividend accumulator, said detecting means causing operation of the subtraction control device when an overdraft occurs whereby to enable the transferring mechanism to correct the overdraft.

7. In a dividing machine, a pair of divisor accumulators, means for entering a divisor positively in one of said accumulators, means for entering a divisor negatively in the other accumulator, a dividend accumulator, means to enter a dividend in said accumulator, read-out mechanism for the divisor accumulators; a selector device normally connecting the negative divisor accumulator to the dividend accumulator through the read-out mechanism whereby to progressively subtract the divisor from the dividend by a succession of cycles of the machine and, when operated, adapted to connect the dividend accumulator to the positive divisor accumulator through the read-out mechanism; a column shifted device controlled by the selector device and operable to cause the read-out mechanism to enter the divisor in selected orders of the dividend accumulator, an overdraft device controlled by the dividend accumulator and operative to cause an operation of the selector device, and means controlled by the selector device for entering a unit in the quotient accumulator each time the divisor is subtracted from the dividend and for subtracting a unit from the quotient accumulator when the selector device is operated.

8. In a machine controlled by records having data designations; two sets of accumulators, one set comprising divisor and dividend accumulators and the other set comprising two divisor accumulators and dividend and quotient accumulators; means controlled by data designations for entering a divisor and a dividend in the accumulators of the first set, means to sense said designations, machine control means controlled by the sensing means, means controlled by the machine control means for transferring the accumulations of the first set of accumulators positively to one of the divisor accumulators and to the dividend accumulator of the second set, means controlled by the divisor accumulator of the first set for transferring the divisor negatively to the second divisor accumulator of the second set, automatic dividing mechanism operative to compute a quotient under control of the two divisor and the dividend accumulators of the second set and to enter the quotient in the quotient accumulator of the second set, automatic total taking mechanism comprising several recording sections certain of which are normally controlled by the first set of accumulators to record the divisor and dividend on a record sheet, means controlled by the dividing mechanism for initiating operation of the total taking mechanism when the quotient computing operations have been completed, and means automatically operative prior to the total taking operation for placing another recording section of the total taking mechanism under control of the quotient accumulator whereby to record the quotient, divisor, and dividend on said sheet.

9. In combination, a record controlled tabulating machine comprising card-reading elements, accumulating mechanism controlled thereby, and means to record totals under control of said accumulating mechanism, said total recording means comprising a plurality of recording sections of which one section may be used to record quotients; a dividing machine consisting of an independent unit comprising a series of dividing accumulators including divisor, dividend and quotient accumulators, means to transfer accumulations of the first-named accumulating mechanism to the divisor and dividend accumulators, means for computing a quotient under control of the divisor and dividend accumulators and entering said quotient in the quotient accumulator, and means controlled by the last-named means for initiating operation of the total recording means; means operative prior to each total taking operation for placing the quotient section of the total recording means under control of the quotient accumulator of the dividing machine, electrical control circuits between said machines forming part of the transferring means, the initiating means, and the means for placing the quotient section under control of the quotient accumulator and separable electrical connectors in said circuits between said machines whereby the dividing machine may be detached from the tabulating machine.

10. In a machine controlled by records arranged in groups; tabulating mechanism including mechanism for accumulating items, means to enter said items in the accumulating mechanism under control of said records, said items comprising a divisor and dividend, and means to detect the end of a group of records; automatic dividing mechanism including means to receive the divisor, an accumulator for receiving the dividend, means to transfer the divisor and dividend from the accumulating mechanism to the divisor receiving means and dividend accumulator, respectively, means under control of the divisor receiving means and the dividend accumulator to compute the quotient including a quotient accumulator; automatic total taking mechanism operable to record totals under the control of the accumulating mechanism and having a portion thereof operable to record the quotient under control of the quotient accumulator; means controlled by the detecting means for initiating operation of the dividing mechanism at the end of each group, and means controlled by the quotient computing mechanism for initiating operation of the total taking means at the end of the quotient computing operation.

11. In an automatic dividing machine, means to analyze data designations in successively presented records, a pair of divisor accumulators and a dividend accumulator, means for entering the divisor positively in one of said accumulators, means for entering the divisor negatively in the other of said accumulators, means for entering the divisor in the dividend accumulator under control of either of the divisor accumulators, means for entering the dividend in the dividend accumulator, means intermediate the analyzing means and the divisor and dividend accumulators for controlling both divisor and dividend entering means whereby to transfer data from the records to said accumulators, selecting means normally rendering the negative divisor accumulator effective to control the entering means for the dividend accumulator and operable to render the positive divisor accumulator effective to control the entering means, and overdraft sensing means controlled by the dividend accumulator for operating the selecting means to cause the divisor to be entered positively in the dividend accumulator when an overdraft occurs in the dividend accumulator.

12. A record controlled machine, comprising means to sense data designation representing divisor and dividend in successively presented records, accumulating mechanism for separately accumulating the divisor and dividend under control of the sensing means, and automatic group control mechanism operative to stop the operation of the record controlled machine at the end of a group of records; and an automatic dividing machine comprising means to retain the divisor and a dividend accumulator, means to effect a transfer of the divisor and dividend from the accumulating mechanism of the record controlled machine to the divisor retaining means and dividend accumulator of the automatic dividing machine, means to compute a quotient under control of the divisor retaining means and dividend accumulator of the dividing machine including an accumulator for the quotient, means controlled by the group control mechanism to initiate operation of the transferring means as a preliminary to starting quotient computing operations of the dividing machine, means to automatically start quotient computing operations upon completion of the operation of the transferring means, and means controlled by the quotient computing means for automatically restarting the record controlled machine upon completion of the quotient computing operation.

13. A record controlled machine, comprising record analyzing means for sensing data designations representing divisor and dividend disposed in the columns of a series of records successively presented to the analyzing means, divisor and dividend accumulating means for receiving the divisor both positively and negatively and the dividend positively, means to enter the divisor and dividend in the accumulating means including means to enter the divisor negatively, devices intermediate the analyzing means and the divisor and dividend accumulating means for controlling the entering means to transfer the divisor and dividend from said series of records to the divisor and dividend accumulating means to form the basis for computing a single quotient by the quotient computing means, a quotient accumulator; means to compute the quotient and enter the quotient in its accumulator including means to transfer the divisor negatively to the dividend accumulating means under control of the negative divisor accumulating means until an overdraft occurs, an overdraft sensing device controlled by the dividend accumulator, selector means controlled by the overdraft sensing means for controlling the transfer means to cause the divisor to be transferred positively to the dividend accumulating means under control of the positive divisor accumulating means, a denomination selecting device controlled by the selector means for selecting the denominations of the dividend accumulating means into which the divisor is to be entered positively and negatively under control of the overdraft sensing means, and means controlled by the denomination selecting means for entering the quotient in the quotient accumulator.

HERBERT J. UMHAUER.